United States Patent [19]

Rock et al.

[11] 4,163,491

[45] Aug. 7, 1979

[54] WOOD VENEER CLIPPER INFEED CONVEYOR RETRACTABLE HOLDDOWN MECHANISM

[75] Inventors: Vincent M. Rock, Issaquah; Arne R. Severinsen, Seattle, both of Wash.

[73] Assignee: Elliott Bay Plywood Machines Co., Seattle, Wash.

[21] Appl. No.: 811,323

[22] Filed: Jun. 29, 1977

[51] Int. Cl.² .............................................. B65G 15/00

[52] U.S. Cl. ...................................... 198/836; 83/422

[58] Field of Search ................ 198/836; 271/272, 273, 271/274; 83/422, 64, 65

[56] References Cited

U.S. PATENT DOCUMENTS 2,979,186 4/1961 Sehn et al. ...................... 83/422 UX

*Primary Examiner*—Robert B. Reeves

*Assistant Examiner*—Douglas D. Watts

*Attorney, Agent, or Firm*—Christensen, O'Connor, Johnson & Kindness

[57] ABSTRACT

A retractable holddown mechanism for veneer clipper infeed conveyors comprising a novel means to control the action of retractable holddown bars that yieldably clamp the veneer flat against conveyor belts during normal operation and that, in the event of an obstruction at the clipper entrance, are caused to retract in a programmed motion that first provides relief allowing the veneer to pile up for a short time with reduced tendency to break up where it accumulates most rapidly, and that thereafter clears the conveyor for removal of the jammed veneer with minimum difficulty.

10 Claims, 5 Drawing Figures

WOOD VENEER CLIPPER INFEED CONVEYOR RETRACTABLE HOLDDOWN MECHANISM

BACKGROUND OF THE INVENTION

This invention relates to improvements in wood veneer clipper infeed conveyor systems and is herein illustratively described by reference to the presently preferred embodiment thereof. A broad object of the invention is to provide an improved veneer holddown device operatively associated with a veneer supporting infeed belt conveyor that overcomes certain prior art difficulties such as uncontrolled damage of jammed veneer and limited accessibility to remove crumbled veneer from the clipper entrance when a pileup occurs, and also such as unexpected breakage of elements that can enter the clipper unnoticed and cause damage to the blade and anvil parts.

In the course of a preliminary search regarding novelty of the invention, the following U.S. patents were noted as being of possible interest: U.S. Pat. Nos. 1,535,596; 2,038,770; 2,652,077; 3,244,044; 3,750,512; 3,837,250. These patents are believed to illustrate generally the state of the prior art on holddown and feed mechanisms of possible interest in relation to this invention. However, none suggests nor provides solutions to the problems of quickly clearing pileups of veneer in clipper machines, nor do they disclose an operable arrangement for minimizing damage to the veneer in the event of a pileup thereof at the entrance of a veneer clipper.

Typically, wood veneer emerging from a peeler lathe and advancing to the clipper does not lie flat, especially if peeled from an unsteamed log. Moreover, the veneer is not always in the form of a continuous uninterrupted sheet. The inevitable humps, waves and breaks in the veneer, and the occasional splinters and jagged edges that project out of the base plane of the veneer can cause the advancing sheet to catch on the clamp foot or other parts immediately adjacent to the clipper, thus causing a pileup. Inasmuch as the veneer is moving very rapidly (i.e., in the order of 300 or more feet per minute), an obstruction of this nature causes the oncoming veneer to crumble and roll up in a disordered pile very quickly. One requirement to minimize the jamming tendency is to clamp the veneer flat against the underlying conveyor surfaces up closely adjacent to and some distance ahead of the clipper, thereby presenting the veneer in flat planar condition to the maw of the clipper. However, unduly high clamping pressures must be avoided because of the greatly increased loading friction imposed thereby on the conveyor with a consequent unduly high feed power requirement. Moreover, even with precautions taken in the design of conventional veneer holddown mechanisms attempting to satisfy these requirements, obstructions still can and do occur. Accordingly, in addition to meeting these operating requirements, the present infeed conveyor holddown mechanism is further so constituted that, in the event of a pileup, it will retract its holddown elements in such a way as to provide immediate space relief to the veneer where it is most rapidly accumulating, followed by opening up additional space for convenient access to the veneer so as to permit its prompt removal without undue delays to restoration of normal functioning of the system.

A related object is to provide a motion-defining holddown mechanism that retracts the holddown bars in a sequential pattern permitting them to be reset under pressure against the veneer as closely as possible to the clipper and associated clamping shoe, thereby to minimize any tendency for curved veneer to catch and buckle the veneer advancing behind the clipper. In this same regard, the retraction motion is also so defined so as to minimize any tendency of the jammed veneer to interfere with the retraction.

Still another object hereof is to devise such a system wherein the mechanism is simple, rugged and reliable in operation, and the design of which overcomes former problems with mechanical breakage causing loose parts to damage the clipper elements.

A specific object hereof is to devise a retractable holddown mechanism with individually yieldable holddown bars that accommodate irregular passing humps and gaps in the veneer and when moving back downward thereafter, to do so with a forward component of forward motion, i.e., in the feed direction. As a result, the holddown bars maintain steady parallel tracking paths on the veneer without the necessity of providing heavy and expensive mounting structures on the bars to hold them in parallel relationship merely by mechanical support rigidty.

These and other features, objects and advantages of the invention will become fully evident from the following description by reference to the accompanying drawings.

DETAILED DESCRIPTION REFERRING TO DRAWINGS

Figure 1:
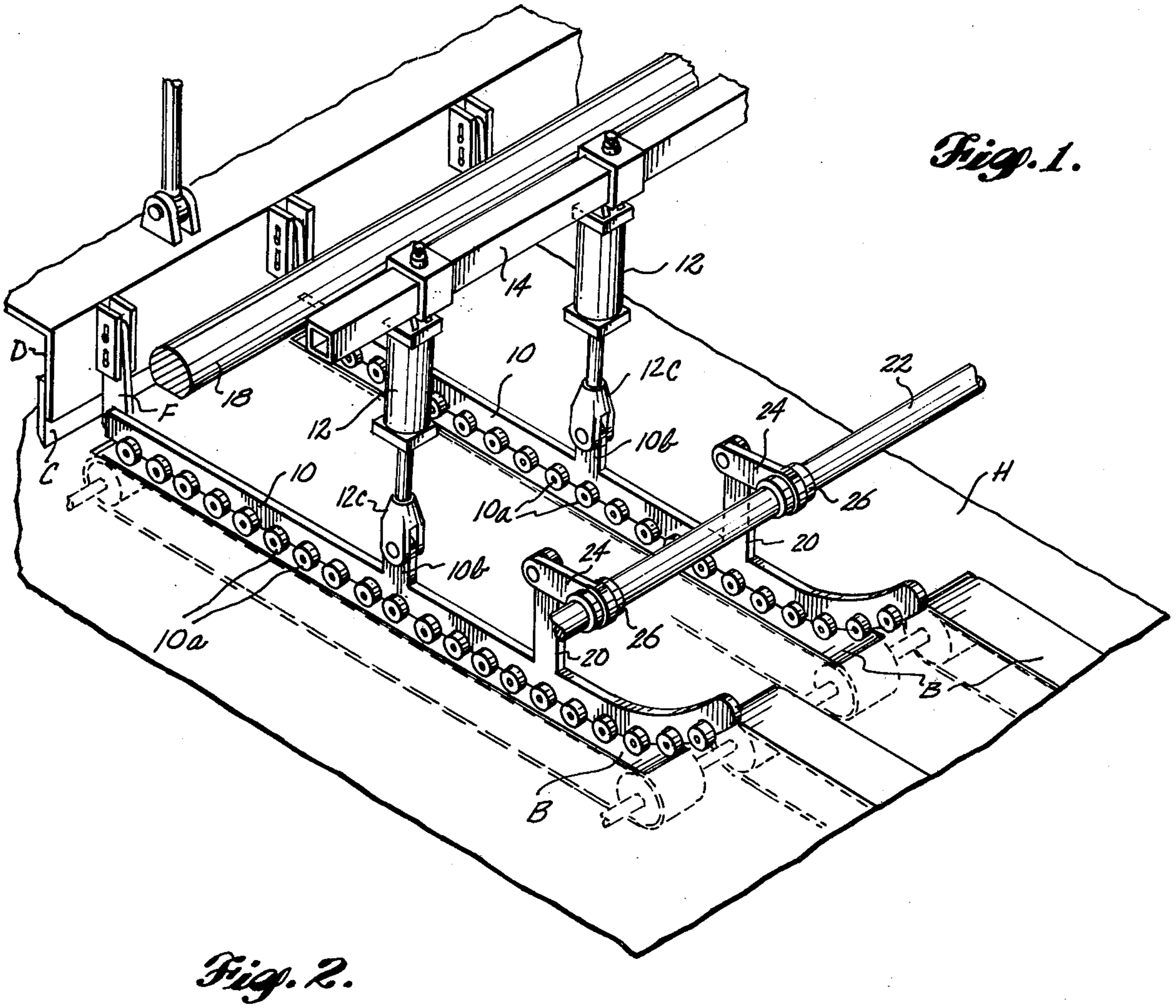
FIG. 1 is an isometric view of a portion of a veneer clipper and associated feed conveyor system with holddown mechanism incorporating the invention, with only two of the total number of holddown bars of the holddown mechanism being depicted for convenience in the illustration.
Figure 2:
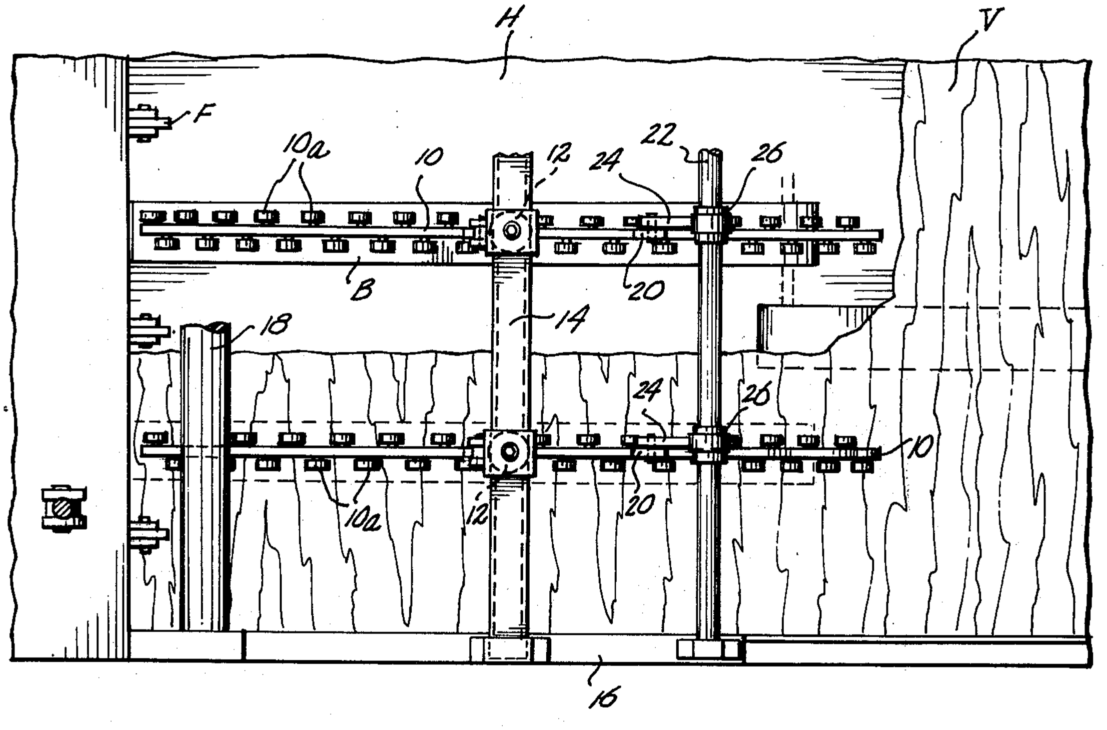
FIG. 2 is a plan view of the apparatus shown in FIG. 1.
Figure 3:
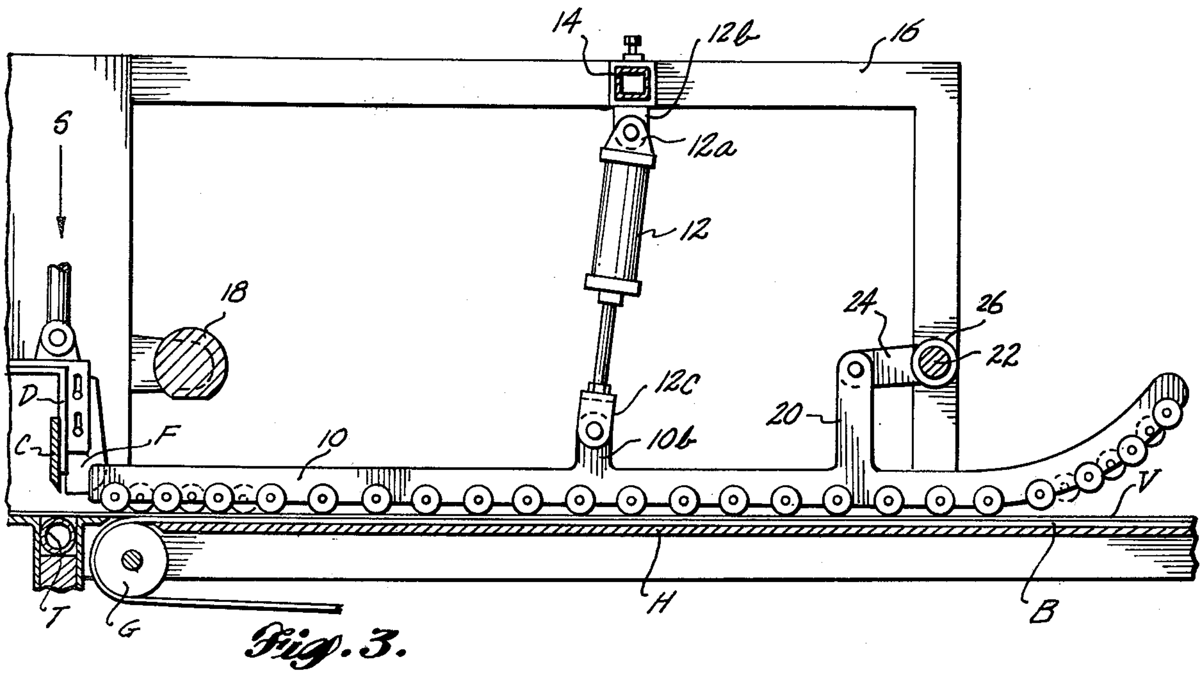
FIG. 3 is a side elevation of the mid-portion of a clipper machine, with the improved holddown mechanism of the invention shown in operating position feeding veneer through the clipper.

As depicted in the accompanying drawings, the veneer V to be clipped for removal of defective regions and/or to cut it into desired lengths advances on a horizontal planar feed conveyor comprising a series of parallel endless support belts B. These belts slide on an underlying support table H adjacent the clipper station S, passing around a common guide pulley or roll G. The veneer clipper blade C is mounted on a vertically reciprocating support bar D and cooperates with an underlying freely revolvable tubular soft metal anvil T. The central axis of the freely revolvable tube T is parallel to but slightly out of the plane of the clipper bar so that with successive cutting strokes of the clipper the revolvable anvil tube is slightly turned by increments to present successively new surfaces to the blade in the conventional manner. A spring-pressed clamping foot F, mounted by suitable means on bar D extending closely along the blade, acts to clamp the veneer momentarily in stationary position against the underlying support surface E adjacent conveyor guide pulleys G during the very brief instants the blade drops and rises in executing its quickly performed cutting strokes. Because this interval is so very short, brief arresting of the veneer in this manner does not interfere with the otherwise continuous feed of the veneer by the continuously running parallel conveyor belts B. The illustrative mechanism as thus far described is of conventional, well known form and operation, hence requires no further elaboration herein.

The present improvements relate to the retractable holddown means by which the veneer V is held in contact with the powered parallel, co-planar veneer-supporting conveyor belts B. Rollers may or may not be set in the table surface to decrease belt friction thereon. The holddown mechanism here provided includes a series of parallel holddown bars 10 mounted abreast of each other in parallel relationship, with each bar overlying and cooperating with one of the parallel feed belts B. In order to minimize holddown bar friction on the veneer sheet, each bar is provided with a series of free-turning rollers **10*a*** mounted in staggered positions along the respective opposite sides of the bar's lower edge. Thus, even with substantial holddown pressure exerted by the bars downwardly against the advancing veneer the resistance to feed is made as low as possible. Nevertheless, the holddown pressure must be of limited magnitude if the drive power required to feed the veneer is to be kept at a reasonable level.

In the illustrated embodiment holddown pressure exerted on the individual bars in a manner permitting then to yield upwardly as necessary to accommodate passing irregularities and humps in the veneer is applied by low-pressure pneumatic jacks 12. The upper ends of these jacks are pivotally mounted by clevises **12*a* on support brackets 12*b*, in turn carried in common by a stationary transverse support member 14. Member 14 in turn is supported by and between end frame members 16** suitably fastened to the clipper base frame and to the conveyor table. Mounting details here are unimportant.

The pneumatic jacks or actuators 10 are all double acting and are connected to a single low-pressure source of pneumatic pressure through suitable control valve means (not shown) permitting the jacks to be selectively raised or lowered in a conventional manner and when lowered to exert constant holddown pressure on the bars. The pneumatic pressure applied to the actuators is preferably of the order of about three pounds per square inch above atmospheric. With actuators of suitable size this pressure yields approximately twelve to fifteen pounds of downward pneumatic force exerted by each actuator on its associated holddown bar 10.

In normal operation the actuators are extended downward and maintain the holddown bars 12 pressed downwardly with indicated force against the upper surface of the veneer as it advances upon the conveyor belts B. Such downwardly acting pressure permits yielding of the bars but it is sufficient to create the necessary feed traction between the veneer surface and the underlying conveyor belt surfaces.

Figure 4:
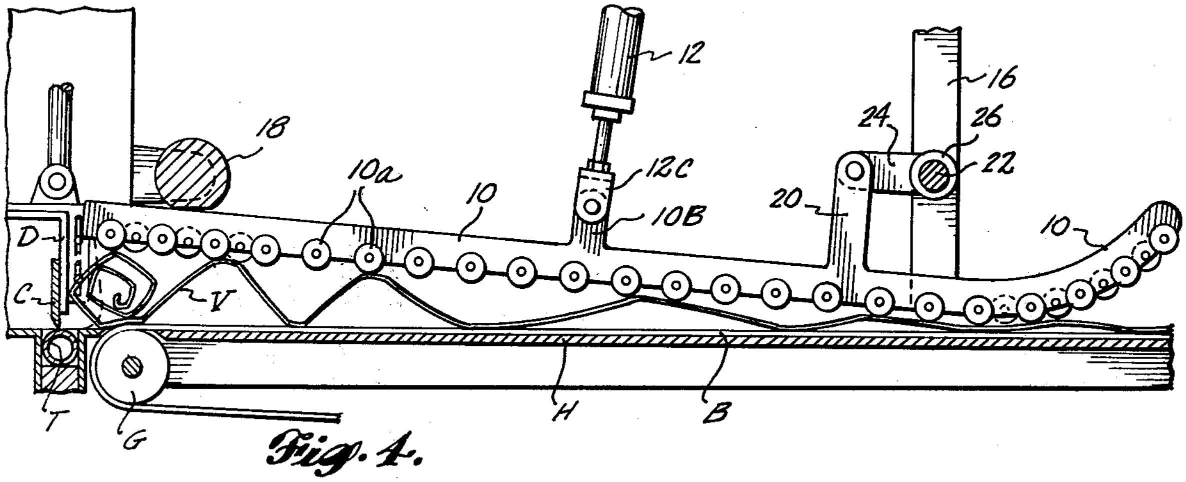
FIG. 4 is a view similar to FIG. 3 with the holddown mechanism undergoing its initial phase of retraction necessary to relieve and clear a blockage of veneer at the clipper.
Figure 5:
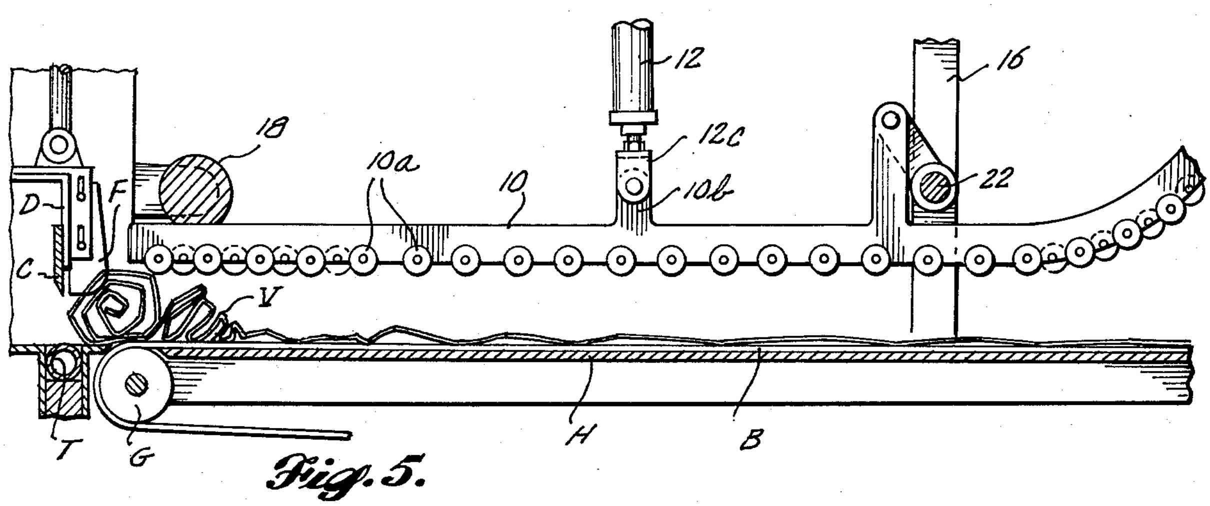
FIG. 5 is a view similar to FIGS. 3 and 4 with the holddown mechanism in fully retracted position wherein the veneer is fully cleared and the belts may be reversed if desired in order to withdraw the buckled veneer for removal of the damaged material.

Preferably the location of the bar mounting bracket **10*b* intermediate the ends of the holddown bars 10 is such that shortening or contraction of the pneumatic actuators 12 lifting the bars causes the ends of the bars adjacent the clipper to rise first, to the extent they have not already been displaced upwardly by force of accumulated veneer. This, in a simple, direct manner, opens up the critical region first, where the veneer first starts to pile up and thus allows some tolerance to accumulation of the veneer without unduly damaging the material. This action is shown in FIG. 4. When these trailing ends of the bars have been retracted upwardly to the desired extent (approximately six inches or so) above the underlying conveyor belts B, they encounter a transversely located positioning stop 18 in the form of a cross-bar that is mounted in stationary position on the machine frame parallel to the clipper blade. After this occurs, continued contraction of the actuators 12 causes the opposite or leading ends of the holddown bars to be swung upward about stop 18 as a fulcrum as shown in FIG. 5. In FIG. 5**, the bars are shown now in fully elevated position, disposed horizontally, spaced approximately six inches above the plane of the supporting conveyor belts B. The veneer is now fully cleared to permit its withdrawal from the conveyor by manual effort or by reversal of the direction of motion of the conveyor belts B in typical manner.

In addition, the programmed retraction of the holddown bars causes them to be move not only upwardly, but longitudinally in the direction away from the clipper C. The sequence is designed to further open up the most critical space where the veneer tends to pile up initially in the event of a jam, and to facilitate the retracting motion of the holddown bars 10 without interference with or from the accumulated veneer in the pileup; also to retract the bars in such a manner as to minimize damage to the veneer in the process of retraction. Moreover, this reversible retraction mechanism also assures returning of the retracted bars thereafter to holddown positions smoothly to positions closely adjacent to the clipper in a manner that irons out and flattens the intervening stretch of veneer for easy entrance into and through the clipper gap. These further objects are accomplished by providing on each bar, forwardly (upstream) of its actuator lug **10*c* a positioning lug 20 projecting upwardly substantially to the level of a transverse horizontally disposed rocker shaft 22 rotatively mounted between the side frame members 16 above belts B. The rocker shaft 22 supports a series of rocker arms or links 24 pivotally connected to the upper ends of the positioning lugs 20. These rocker arms 24 are commonly keyed to the shaft 22 by way of coupling sleeves 26 so that when any arm swings about the shaft's axis the arms all swing conjointly. With the holddown bars 10 pressed against the veneer, the arms 24 are substantially horizontal, that is, extend in trailing positions in a common plane substantially parallel to the support plane of the carrier belts B. In this position of the arms 24 the ends of the holddown bars 10 nearest the clipper are thus held in closest proximity to the cutting plane of the clipper C. However, upon retraction of the bars upwardly by shortening of the pneumatic actuators 12, after the limiting action effected by the stop bar 14, as in FIG. 4, continued elevation of the bars effects upward swinging motion of the arms 24 into the elevated position shown in FIG. 5. The arc of swing of the arms 24** causes the holddown bars to be withdrawn longitudinally from the clipper C. Therefore, not only is the retracting actuator-produced motion of the holddown bars an upward motion, but it is also a longitudinal motion in its latter phase as desired.

As a further feature of the holddown mechanism, the pneumatic actuators 12 are caused to be mounted to the transverse support bar 14 in such a position relative to the position of the bars longitudinally, as established by the control arms 24, as to be inclined out of a transverse vertical plane and in the direction of feed. In other words, the pneumatic actuators when urging the holddown bars against the veneer, do so with a component of force directed toward the clipper, i.e., in the direction of feed. As a result of this longitudinal component of thrust exerted by the actuators 12, aiding the longitudinal displacing effect of the downwardly swinging arms 24, any looseness or lack of lateral rigidity in the bar support linkage between the holddown bars and the transverse rocker shaft 22, including the connection between the lugs 20 and the control arms 24, is continuously taken up by a force exerted in the direction of feed. This helps insure parallel tracking of the holddown bars in substantially vertical planes overlying their associated conveyor belts B. This helps assure constant direction of veneer feed (i.e., continuously works against any tendency of the veneer to slew in a horizontal plane). It also permits the assembly to be easily fabricated with minimum tolerance requirements and minimum requirements for stiff framing and simplifies and reduces cost of the mechanical mounts for the holddown bars.

With the system in operation, the conveyor belts B advance the veneer V progressively edgewise through the gap defined between the clipper C and the underlying anvil T, the clipper being actuated intermittently by the associated operating mechanism (not shown) of suitable or conventional design. Should there be an obstruction at the entrance of the clipper causing the advancing veneer to start piling up, there will be an immediate tendency for the adjacent or trailing ends of the holddown bars 10 to yield upwardly due to the low pneumatic pressure in the actuators 12 and the distance upstream at which they are connected to the bars by lugs **10*b***. This capability of initial yielding adjacent the clipper may to some extent spare the accumulating veneer some damage, particularly if the pile-up is quickly sensed mechanically or by observation and the system operated promptly to reverse the actuators and stop the conveyor.

These and other aspects of the invention will be evident to those skilled in the art based on the foregoing disclosure of the presently preferred embodiment thereof. It will be realized, however, that the invention is not necessarily limited to the specifics of the illustration, but is to be given reasonable scope in terms of the novel contribution as defined in the claims that follow.

What is claimed is:

1. In combination with belt conveyor means operable to support and feed wood veneer in a generally horizontal plane through a veneer clipper, a plurality of elongated transversely spaced veneer holddown bars mounted above the conveyor means in parallel relationship in positions abreast of each other to engage and flatten the veneer under conveyance as it enters the clipper, yieldable reversible actuator means operatively connected to the respective bars intermediate the ends thereof and selectively operable to move the bars into such holddown engagement with the veneer and retractively therefrom in paths lying in parallel vertical planes extending in the direction of feed, and when in such holddown engagement with the veneer to urge such bars yieldably against the veneer, and operatively associated guide means connected to said bars further controlling such motion of the bars to include a vertical component of motion and also a component of motion parallel to the direction of veneer feed, the latter component of motion during bar retraction being directed opposite the direction of veneer feed, said actuator means and guide means cooperatively programming the retraction motion of the bars with the trailing ends thereof adjacent the clipper substantially executing the vertical component of retraction before the opposite or leading ends of such bars undergo substantial retraction motion.

2. The apparatus defined in claim 1, wherein the actuator means are connected to the bars intermediate the ends thereof and the guide means includes abutment means engageable by the bars adjacent the trailing ends thereof to limit the vertical component of retraction motion of such trailing ends.

3. The apparatus defined in claim 2, wherein the guide means includes arms and support means mounting such arms to pivot in vertical planes common to the respective bars about a common transverse horizontal pivot axis, said arms being pivotally connected to the respective holddown bars adjacent the leading ends of such bars, said arms extending substantially horizontally from said support means toward said arms with the bars in holddown position engaging the veneer, whereby upward retraction movement of said bars from the veneer is accompanied by upward swinging of said arms and consequent movement of the bars opposite the direction of veneer feed.

4. The apparatus defined in claim 3, wherein the actuator means comprise at least one selectively reversible pneumatically operated piston and associated cylinder means.

5. The apparatus defined in claim 4, including separate similarly acting piston and cylinder means operatively associated with each of the respective holddown bars and conjointly pressurizable but independently yieldable in reaction to deflecting forces produced by veneer humps passing beneath the same.

6. The apparatus defined in claim 5, wherein the individual piston and cylinder means are mounted in parallel relationship and at an incline to the veneer plane so as to press the associated bars downwardly against the veneer and also in the direction of veneer feed.

7. The apparatus defined in claim 2, wherein the actuator means comprise at least one selectively reversible pneumatic piston and associated cylinder means.

8. The apparatus defined in claim 7, including separate similarly acting piston and cylinder means operatively associated with each of the respective holddown bars and conjointly pressurizable but independently yieldable in reaction to deflecting forces produced by veneer humps passing beneath the same.

9. The apparatus defined in claim 8, wherein the individual piston and cylinder means are mounted in parallel relationship and at an incline to the veneer plane so as to press the associated bars downwardly against the veneer and also in the direction of veneer feed.

10. The apparatus defined in claim 1, wherein the actuator means comprise at least one selectively reversible pneumatically operated piston and associated cylinder means.

* * * * *